(12) United States Patent
Franke

(10) Patent No.: US 9,328,019 B2
(45) Date of Patent: May 3, 2016

(54) PROCESS TO PRODUCE A DURABLE CONCRETE AT HOT AMBIENT CONDITIONS

(71) Applicant: YARA INTERNATIONAL ASA, Oslo (NO)

(72) Inventor: Wolfram Franke, Porsgrunn (NO)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 14/425,949

(22) PCT Filed: Sep. 23, 2013

(86) PCT No.: PCT/EP2013/069700
§ 371 (c)(1),
(2) Date: Mar. 4, 2015

(87) PCT Pub. No.: WO2014/048870
PCT Pub. Date: Apr. 3, 2014

(65) Prior Publication Data
US 2015/0218048 A1    Aug. 6, 2015

(30) Foreign Application Priority Data

Sep. 25, 2012  (NO) .................................. 20121087

(51) Int. Cl.
*C04B 14/00* (2006.01)
*C04B 28/02* (2006.01)
*C04B 28/04* (2006.01)
*C04B 40/00* (2006.01)
*C04B 7/26* (2006.01)

(52) U.S. Cl.
CPC . *C04B 14/00* (2013.01); *C04B 7/26* (2013.01); *C04B 28/02* (2013.01); *C04B 28/04* (2013.01); *C04B 40/0028* (2013.01)

(58) Field of Classification Search
CPC .............................. C04B 22/085; C04B 28/02

USPC ......................................................... 106/819
See application file for complete search history.

(56) References Cited

U.S. PATENT DOCUMENTS

| 4,747,877 A | 5/1988 | Braun |
| 5,176,753 A | 1/1993 | Brook |
| 6,273,191 B1 | 8/2001 | Reddy et al. |
| 2005/0223717 A1 | 10/2005 | Bourgault et al. |
| 2008/0308013 A1 | 12/2008 | Sabio et al. |

FOREIGN PATENT DOCUMENTS

| EP | 1 731 491 | 12/2006 | |
| EP | 2 090 560 | 8/2009 | |
| GB | 2 354 235 | 3/2001 | |
| WO | WO 2009/016230 A2 * | 2/2009 | .............. C04B 40/00 |
| WO | WO 2012/175660 A1 * | 12/2012 | .............. C04B 28/02 |

OTHER PUBLICATIONS

International Search Report and Written Opinion of the International Search Authority issued Nov. 22, 2013 in International (PCT) Application No. PCT/EP2013/069700.
International Preliminary Report on Patentability issued Dec. 15, 2014 in International (PCT) Application No. PCT/EP2013/069700.
Justnes et al., "Hardening retarders for massive concrete", American Concrete Institute, SP-253, 2008, pp. 41-56.
Clemmens et al., "Influence of Setting Accelerators on Chemical Shrinkage of Portland Cement", American Concrete Institute, SP-200, 2001, pp. 235-249.

* cited by examiner

*Primary Examiner* — Anthony J Green
(74) *Attorney, Agent, or Firm* — Wenderoth, Lind & Ponack, L.L.P.

(57) ABSTRACT

The invention relates to the use of calcium nitrate for producing a cementitious composition and/or a cementitious solid at high ambient temperatures. The invention is directed to ensuring sufficient hydration by a limitation of the maximum hydration temperature.

9 Claims, 4 Drawing Sheets

PROCESS TO PRODUCE A DURABLE CONCRETE AT HOT AMBIENT CONDITIONS

The invention relates to the use of calcium nitrate for producing a cementitious composition and/or a cementitious solid at high ambient temperatures. The invention is directed to ensuring sufficient hydration by a limitation of the maximum hydration temperature. As the calcium nitrate accelerates the setting time of said cementitious composition, this invention is especially of interest for pre-cast concrete using heat or on-site casted concrete in hot ambient conditions or in hot geographical regions.

BACKGROUND OF THE INVENTION

Concrete sets as cement hydrates. Hydration is an exothermic reaction, which means that it generates heat, and that reactions proceed faster when the concrete is hot. Quick reacting cements, like CEM I 52.5 R, produce comparatively quickly high temperatures, but as many reactions happen within a short time, the heat production is high, too, and as a consequence of heat flow limitation due to thermal resistance of concrete and the high ambient temperature, the heat accumulates in the concrete—and the maximum temperature may exceed 60° C. This may lead to strong deformations and therefore induce cracking, as well as ettringite formation afterwards.

Also, when cement hydrates, it takes up water and grows crystals around the aggregate particles. In hot ambient conditions and when the hydration reaction proceeds rapidly, the crystals grow quickly but don't have time to grow strong. Early strength of the resulting concrete will be higher, but 28-day strength will suffer. If the resulting concrete is about 10° C. hotter than normal (for example, 31° C. instead of 21° C.), the ultimate compressive strength will be about 10% lower.

Furthermore, in hot ambient conditions, as the cement sets, slump decreases rapidly and more mixing water is needed. This can also contribute to lower strengths (as much as another 10%), and in integrally coloured concrete, can lead to variations in water content which can result in significant differences in concrete colour between adjacent pours.

Another potential problem in hot ambient conditions is surface drying or plastic shrinkage, which occurs as fresh concrete loses its moisture too quickly after placement but before any strength development has occurred. This type of shrinkage is affected by environmental effects of temperature (of the concrete and ambient), wind and relative humidity. It is a particular problem in hot ambient concreting.

Hence, it is vital to maintain the temperature of concrete at a satisfactory level during curing, which presents considerable challenges because of the wide ambient temperatures encountered when casting concrete. The ASCC (American Society for Concrete Contractors) recommends that the temperature of the concrete is maintained between 10 and 21° C., in particular below 21° C.

The problem has been addressed in several ways, such as the use of slow reacting cements, such as fly ash-based cements, the use of cool or chilled water, the use of cooled aggregates, adding ice to the concrete mixture, the use of apparatus for cooling concrete during curing (see US 2005/0223717, Bourgault and Dancey, 2005) and the use of retarders or retarders admixtures. Retarders provide that the heat release is distributed over a longer time. Retarders can be added at the plant or on the job site to delay concrete setting time, which can be very quick when the concrete is hot. Retarders provide extra time but they also give the concrete more time to dry out, so curing is critical. Usually, the use of retarders also comes at the price of delayed setting. In case of hot ambient temperatures, for instance in the Middle East region, hydration delay and aimed construction progress need to be balanced, and this may present a challenge. In case of pre-cast concrete production, the heat issue leads to tension problems, too. And the risk of overheating by steam induced heat push is given as well. Also, if too much retarder is added to the concrete, used for a slab, it can lead to crusting, where the surface sets but the concrete below is still soft. This can reduce the flatness and even lead to delamination of the surface.

It is known to use 2 weight % of calcium nitrate as a setting accelerator in an admixture up to a temperature of 23° C., where setting is shifted to an earlier stage in the curing process (*Influence of setting accelerators on chemical shrinkage of portland cement*, Clemmens et al. American Concrete Institute, SP (2001), SP-200-15 (Fifth CANMET/ACI International Conference on Recent Advances in Concrete Technology, 2001), p. 235-249).

It is also known that calcium nitrate is able to shift the maximum heat release to an earlier point of time in the curing process. By this, the hydration energy is distributed over a period of time where without it, just low activity would happen. Hence, the setting starts very early, but heat is released more evenly (*Hardening retarders for massive concrete*, Justnes et al. American Concrete Institute, SP (2008), SP-253, p. 41-56 using maximum 1.5 weight % of calcium nitrate as setting accelerator in combination with a minor amount (0.1-0.3%) of a strong setting retardant like urea and organic acids (such as citric acid and tartaric acid). It was demonstrated (see FIG. 3) that, at a temperature of 40° C., the rate of heat evolution for a reference cement paste (without calcium nitrate) and for a paste comprising 1.5 weight % of calcium nitrate, is similar, and that the admixture combination (calcium nitrate and setting retardant) at 40° C. may not function in the practical semi-adiabatic case of massive concrete.

Hence, there is a need for a cementitious composition that can be produced and cured at hot ambient temperatures and wherein the heat release is distributed over time, and wherein the maximum temperature is lowered upon curing.

DETAILED DESCRIPTION OF THE INVENTION

It is the primary goal of the present invention to provide a cementitious composition that can be produced and cured at hot ambient temperatures, as well as a new use for calcium nitrate, in particular to produce a cementitious composition and/or a cementitious solid at hot ambient temperatures.

Concrete is a composite construction material composed primarily of aggregate, cement, and water. There are many formulations, which provide varied properties. The aggregate is generally a coarse gravel or crushed rocks such as limestone, or granite, along with a fine aggregate such as sand. The cement, commonly Portland cement, and other cementitious materials such as fly ash and slag cement, serve as a binder for the aggregate. Various chemical admixtures are also added to achieve varied properties. Water is mixed with the dry concrete mixture, which enables it to be shaped (typically poured or casted) and then solidified and hardened (cured, set) into rock-hard strength concrete through a chemical process called hydration. The water reacts with the cement, which bonds the other components together, finally creating a robust stone-like material. Concrete can be damaged by many processes, such as the freezing of water trapped in the concrete pores.

Concrete is widely used for making architectural structures, foundations, brick/block walls, pavements, bridges/overpasses, motorways/roads, runways, parking structures, dams, pools/reservoirs, pipes, footings for gates, fences and poles and even boats.

Within the scope of this application, a cementitious composition should be interpreted as comprising anyone of a mortar composition, a concrete composition, and a cement paste composition, which has not been casted, cured, hydrated, set and/or hardened. A mortar composition comprises at least a fine aggregate, such as sand and cement. A cement paste composition comprises at least cement. A cementitious composition does not contain added water in such amounts that setting starts. In this respect, one could also speak of a cementitious composition in the dry state. According to a preferred embodiment, the cementitious composition is produced by adding all ingredients together and thoroughly mixing said ingredients until a homogeneous composition is obtained.

Within the scope of this application, a cementitious solid should be interpreted as the casted, cured, hydrated, set and/or hardened cementitious composition, comprising anyone of a mortar, a concrete and a cement paste and water. A cementitious solid is usually obtained by adding water to a cementitious composition, which initiates the curing process. According to a preferred embodiment, the cementitious solid is produced by adding water to the cementitious composition.

Within the scope of this application, hot ambient conditions are defined as conditions with an ambient temperature of 21° C. or more, such as more than 22, 23, 24, 25, 26, 27, 28, 29, 30, 31, 32, 33, 34, 35, 36, 37, 38, 39, 40, 41, 42, 43, or 44° C.

Preferably, hot ambient conditions are defined as conditions with an ambient temperature in the range of 25 to 45° C., more preferably 30 to 45° C., most preferably 35 to 45° C.

Surprisingly, it has now been found that by incorporating at least 3 weight % of calcium nitrate (relative to the weight of the cement) to the cementitious composition, the calcium nitrate does not provoke overheating at hot ambient conditions when the cementitious composition is cured into a cementitious solid, in particular at temperatures of 21° C. or above. By shifting the hydration under hot ambient conditions, the increased initial activity while setting starts, leads to a lower increase of temperature as the cement would deliver without that influence later on. This effect is not predicted from the prior art, where concentrations only up to 1.5 weight % are disclosed at hot ambient temperature (40° C.) for admixtures comprising calcium nitrate (no effect) or in combination with strong retardants (minor effect). The high amount of calcium nitrate in the compositions according to the invention shifts part of the reactions to even earlier stages than in the prior art. The approach by Justnes et al. aims on early setting but slow hydration and low hydration heat release. Hence, the retardation effect originates from preventing reactions (by using the strong setting retardant) whereas our invention is aimed at shifting accelerations to early stages to avoid reactions (and heat release) later on in the setting and hardening process.

Hence, the invention relates to the use of calcium nitrate for producing a cementitious composition and/or a cementitious solid at high ambient temperatures in the range of from 21 to 45° C., preferably in the range of from 30 to 45° C., more preferably in the range of from 35 to 45° C., wherein the cementitious composition and/or the cementitious solid comprises at least 3 weight % of calcium nitrate, relative to the weight of the cement.

The invented process has the ability to cool down a producing a cementitious composition and/or a cementitious solid that is being cured at hot ambient conditions, in particular at temperatures of 21° C. or above. Therefore, the process can limit the maximum occurring temperature only to the level of the ambient temperature.

Calcium nitrate is an inorganic compound with the formula $Ca(NO_3)_2$. This colourless salt absorbs moisture from the air and is commonly found as a tetrahydrate. It is mainly used as a component in fertilizers. A variety of related salts are known including calcium ammonium nitrate decahydrate and calcium potassium nitrate decahydrate. Different calcium nitrate salts are available from Yara International ASA (Oslo, Norway) under the brand names NitCal (a solid with a concentration of about 78 weight % of calcium nitrate), NitCal/K (a solid with a concentration of about 76 weight % of calcium nitrate) and NitCal Sol (an aqueous liquid with a concentration of 50 weight % calcium nitrate), all of them marketed as a chlorine-free multifunctional concrete admixture. It may be used as a dry material (granulated or prilled) or as a liquid (for example, as an aqueous liquid in a concentration of 50 weight % calcium nitrate). It may also be used (and it acts) as a corrosion inhibitor, since the nitrate ion leads to formation of iron hydroxide, whose protective layer reduces corrosion of the concrete reinforcement.

In one embodiment, the invention relates to a use according to the invention, wherein the cementitious composition and/or the cementitious solid comprises 3 to 5 weight % of calcium nitrate, relative to the weight of the cement.

The invention is beneficial over existing admixtures for curing a cementitious solid, in particular a concrete at hot ambient temperatures as the concrete sets early, but the critical temperatures can still be avoided. Preferably, fly ash blended cements, such as a Portland fly ash cement (OEM II type), can be utilised in hot climate conditions to avoid high temperature peaks because they are slow-reacting cements, compared to type I cements.

According to one embodiment, the cementitious composition and/or a cementitious solid is free, or at least comprises less than 0.1 weight %, relative to the weight of the cement, of a compound selected from the group of urea, citric acid and tartaric acid.

Preferably, a quick Portland cement of the CEM I 52.5 class can be utilised for pre-cast concrete production to quickly deliver strength.

Preferably, the water to cement ratio is in the range of 0.45 to 0.55. This is required to prevent drying out of the cementitious solid during curing.

Preferably, the calcium nitrate is added to the water for preparing the cementitious composition. It is important that calcium nitrate is incorporated into the cementitious composition right from the start. It should be added prior to any plasticiser to increase impact on setting time.

Hence, the invention also relates to a method of curing a cementitious composition at high ambient temperatures in the range of 21 to 45° C. into a cementitious solid, wherein the method comprises the steps of:
  providing a cementitious composition in the dry state,
  adding and mixing water into the cementitious composition in the dry state to form the cementitious composition to be cured, and
  shaping the cementitious composition to be cured and allowing it to cure into the cementitious solid, characterised in that from 3 to 5 weight % of calcium nitrate, relative to the weight of the cement, is added to the water before mixing the water with the cementitious composition in the dry state.

Because the workability time is short, in many cases, it is too short for the transportation of the cementitious mixture.

The listing or discussion of an apparently prior-published document in this specification should not necessarily be taken as an acknowledgement that the document is part of the state of the art or is common general knowledge.

The invention is further elucidated by means of the following examples and the accompanying figures. The following non-limiting examples only serve to illustrate the invention and do not limit its scope in any way. In the examples and throughout this specification, all percentages, parts and ratios are by weight unless indicated otherwise. It will be appreciated that the various percentage amounts of the different components that are present in the products of the invention, including any optional components, will add up to 100%.

EXPERIMENTAL

Comparative Example 1

Figure 1:
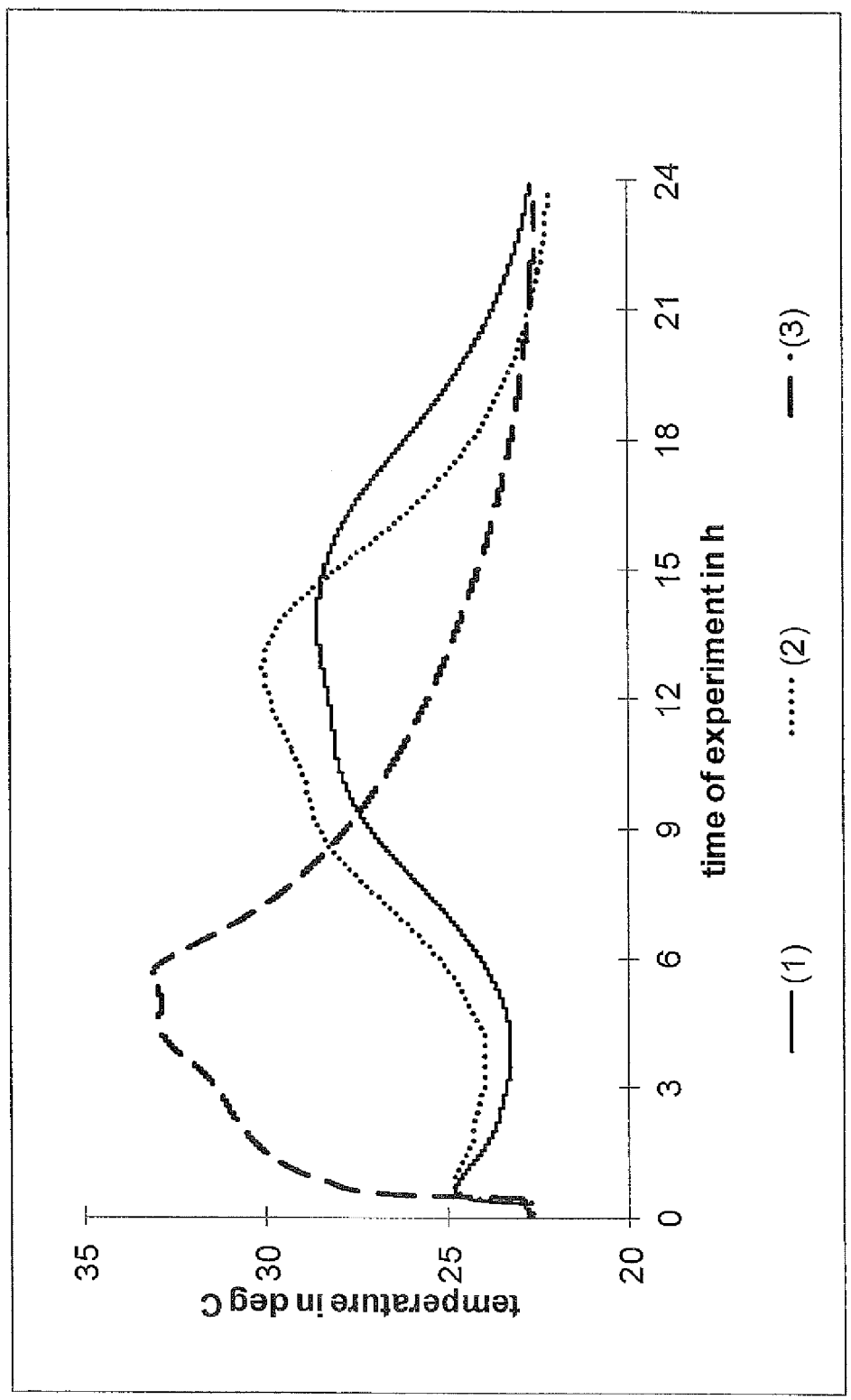
FIG. 1: Temperature profile over time for slow-reacting cement paste samples cured at 20° C. ambient temperature.

Cement paste samples with a CEM II/A 42.5 fly ash cement (slow reacting cement) were prepared. Sample size was 500 ml. The temperature was measured in the sample core. Samples were cured at 20° C. ambient temperature. Calcium nitrate was added in weight % amounts relative to the weight of the cement. The temperature profile is shown in FIG. 1. As a reference, sample (1) was prepared without calcium nitrate. The addition of 1 weight % of calcium nitrate (sample 2) increased the temperature slightly and the setting was also shifted slightly towards an earlier moment in time. The addition of 4 weight % of calcium nitrate (sample 3) increased the maximum temperature significantly, but hydration reactions took place far earlier in time. In addition, the period without significant heat release (in samples (1) and (2) between 1 and 4 hours of the experiment) is overrun by the high dosage calcium nitrate treated sample (3) and setting starts very early.

Example 1

Figure 2:
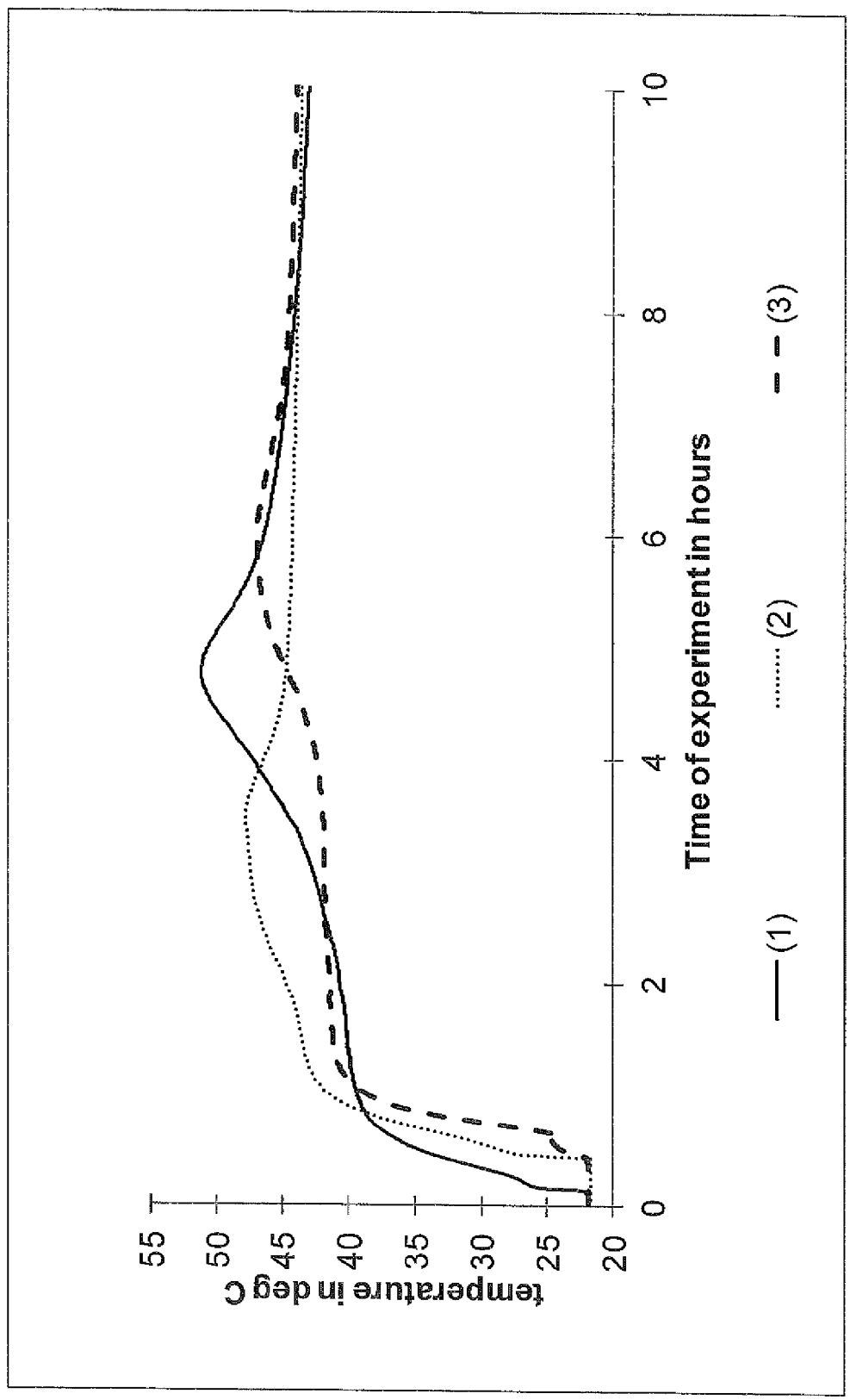
FIG. 2: Temperature profile over time for slow-reacting cement paste samples cured at 45° C. ambient temperature.
Figure 3:
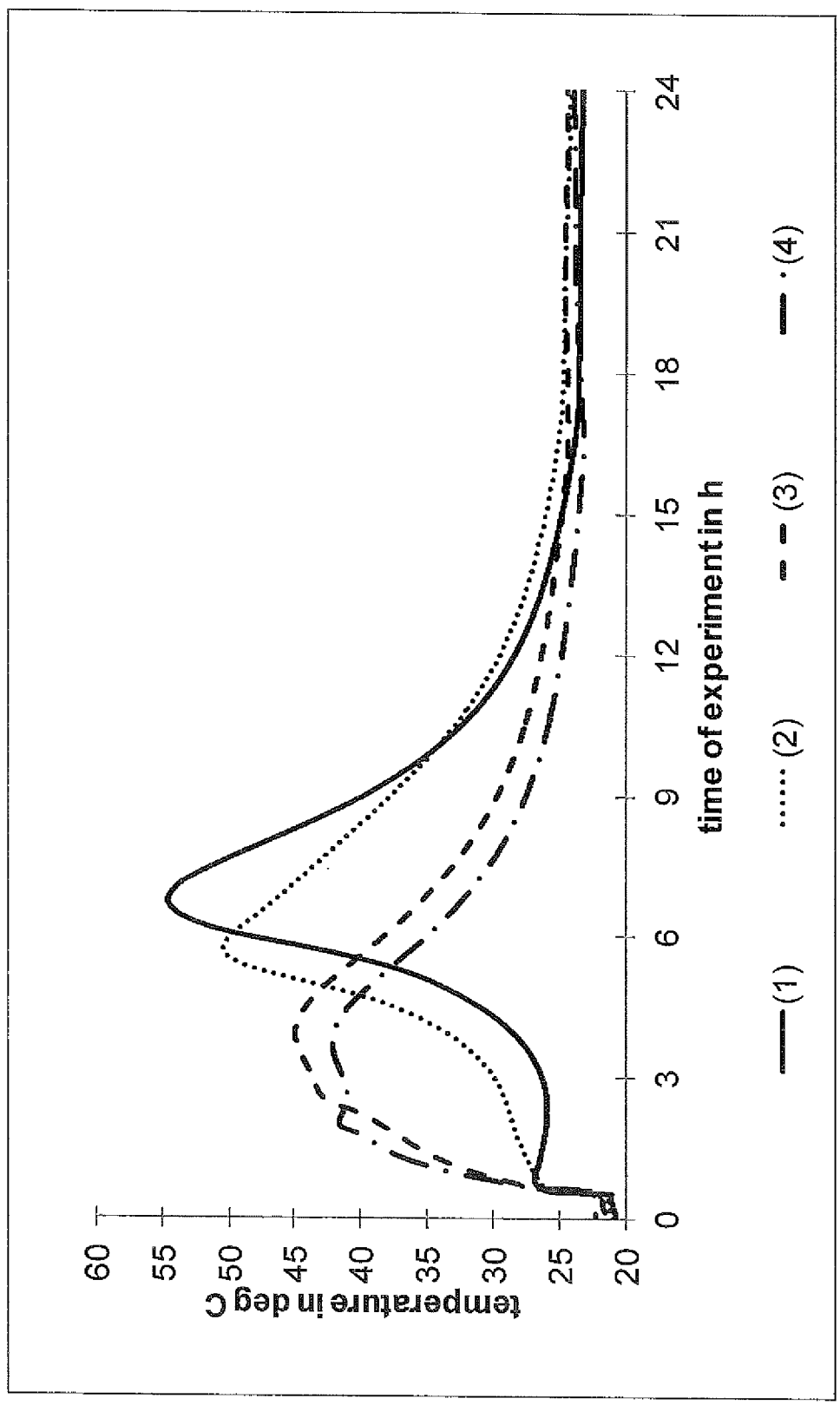
FIG. 3: Temperature profile over time for fast-reacting cement paste samples cured at 21° C. ambient temperature.

Cement paste samples with a CEM II/A 42.5 fly ash cement (slow reacting cement) were prepared. Sample size was 500 ml. Temperature was measured in the sample core. Samples were cured at 45° C. ambient temperature in a controlled water bath. Calcium nitrate was added in weight % amounts relative to the weight of the cement. The temperature profile is shown in FIG. 2. The presence of 4 weight % calcium nitrate in sample (2) reduced the temperature and the setting was shifted to an earlier stage in the process compared to an untreated sample (1). In sample (3), 0.5 weight % of a plasticizer (modified lignosulphonate, MLS) was added in addition to calcium nitrate, and the retarding effect can be clearly seen in FIG. 2.

Example 2

Calcium nitrate is also able to cool (fast-reacting) cement. Cement paste samples with a CEM I 52.5 cement (fast reacting) are prepared. Sample size is 500 ml. Temperature is measured in the sample core. Samples are cured at 21° C. ambient temperature. Sample (1) as reference is close to critical temperature level. Calcium nitrate is added with relation to cement weight in %. Addition of 1% calcium nitrate in sample (2) reduces the peak temperature slightly. Increased dosages to 4% (sample (3)) and 5% (sample (4)) shifts initial setting to almost immediate, and hydration temperature is reduced significantly by more than 10 degree Celsius.

Example 3

Figure 4:
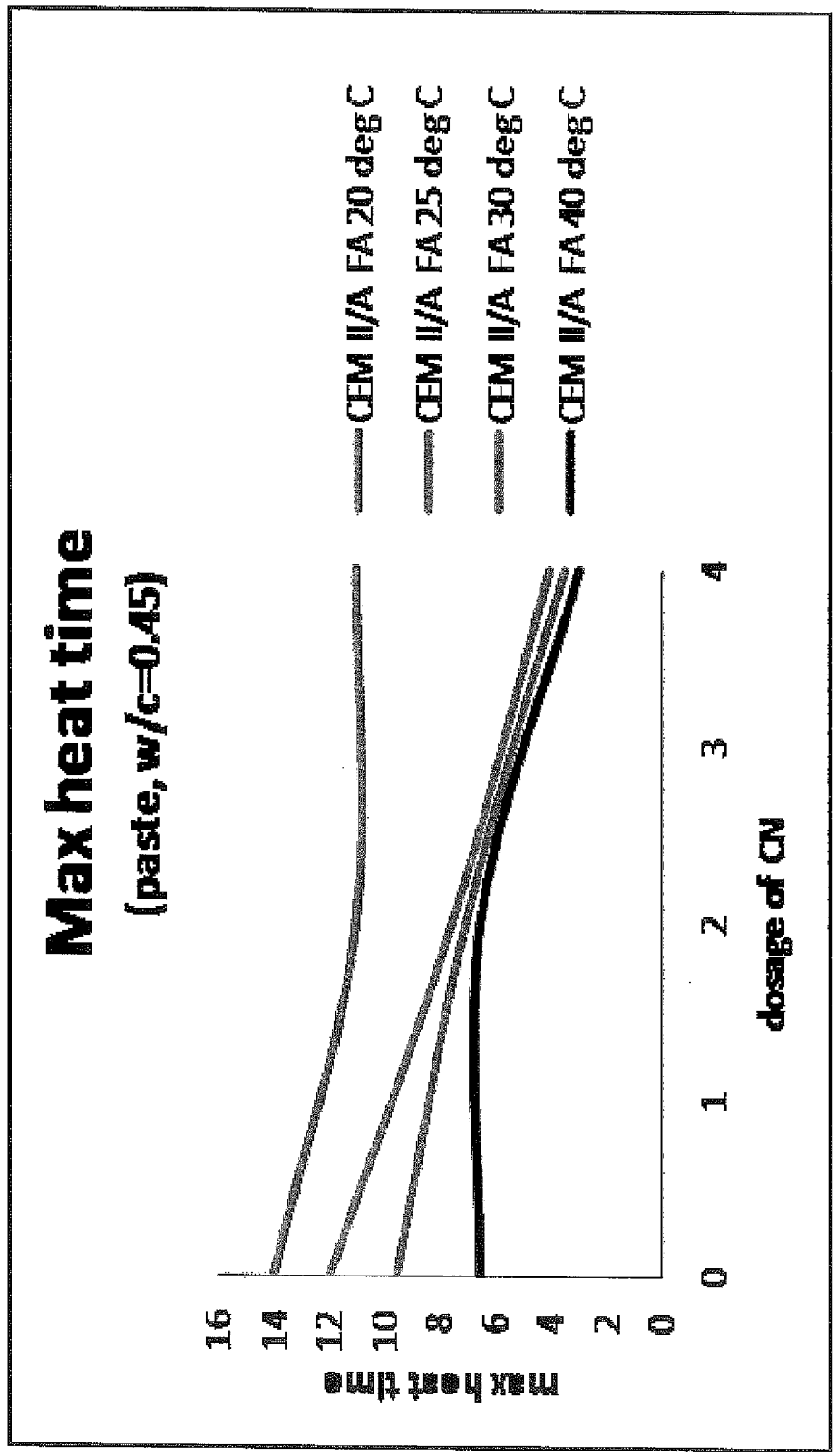
FIG. 4: Peak shift of maximum temperature as function of dosage of calcium nitrate and curing temperature for slow-reacting cement paste samples.

Cement paste samples with a CEM II/ A 42.5 fly ash cement (slow-reacting) were prepared. Sample size was 500 ml. Temperature was measured in the sample core. Samples were cured at different temperatures (20, 25, 30 and 40° C.) and prepared with different amounts of calcium nitrate (0, 1, 2, 3, 4%). From FIG. 4, it can be seen that for this type of (slow-reacting) cement, the effect of calcium nitrate depends on dosage. The peak of the maximum temperature shifts to an earlier moment in time depending on dosage and ambient temperature. However, it can be stated that the maximum temperature was always the same, even though ambient temperature changed.

The invention claimed is:

1. A method of curing a cementitious composition into a cementitious solid, comprising:
   providing the cementitious composition, comprising cement, in a dry state,
   adding and mixing water into the cementitious composition in the dry state to form a cementitious composition to be cured, and
   shaping the cementitious composition to be cured and allowing the cementitious composition to be cured to cure into the cementitious solid,
   wherein from 3 to 5 weight % of calcium nitrate, relative to the weight of the cement, is added to the water before mixing the water with the cementitious composition in the dry state, and
   wherein the curing occurs at high ambient temperatures in the range of 21 to 45° C.

2. The method according to claim 1, wherein the curing occurs at high ambient temperatures in the range of 30 to 45° C.

3. The method according to claim 1, wherein the curing occurs at high ambient temperatures in the range of 35 to 45° C.

4. The method according to claim 1, wherein the cementitious composition and/or a cementitious solid comprises less than 0.1 weight %, relative to the weight of the cementitious composition and/or the cementitious solid, of a compound selected from the group consisting of urea, citric acid, and tartaric acid.

5. The method according to claim 1, wherein the cementitious composition and/or the cementitious solid is a Portland cement of the CEM I class.

6. The method according to claim 1, wherein the cementitious composition and/or the cementitious solid is a Portland fly ash cement of the CEM II class.

7. The method according to claim 1, wherein a water to cement ratio is in the range of 0.45 to 0.55 w/w.

8. The method according to claim 1, wherein the cementitious composition is selected from the group consisting of a mortar composition, a concrete composition, and a cement paste composition.

9. The method according to claim 1, wherein the cementitious solid is selected from the group consisting of a mortar, a concrete, and a cement paste.

* * * * *